(12) United States Patent
Scarbrough

(10) Patent No.: X8756
(45) Date of Patent: Apr. 8, 1835

(54) STEAM, GENERATING

(76) Inventor: William Scarbrough

William Scarbrough, Savannah Georgia

Letters Patent

The schedule referred to in these Letters Patent and making part of the same containing a description in the words of the said William Scarbrough himself of his Improvement in the generation of Steam in the boilers of Steam Engines &c.

To all to whom these presents shall come, Be it known that I William Scarbrough of the City of Savannah in the County of Chatham & State of Georgia have made new and useful improvements in the generating Steam in the boilers of Steam engines &c and that the following is a full and exact description thereof.

I first assumed as a fact that the pressure of the steam already generated within a boiler is equal in its force upon the surface of the water from which fresh steam is to be generated to that on the parts of the boiler above the surface of the water. I next assumed that in proportion to the extent of this pressure the particles or molecules of this water are compacted together; and that in proportion to this compaction is the difficulty of obtaining admission or entrance for the caloric or heat to the various particles or molecules of this water which are to furnish the required vapour or steam. That this is a false theory we have the evidence in the influence of the pressure of the atmosphere on water which has to undergo ebullition. At Vera Cruz we find the boiling point of water to be [illegible], 212 degrees of the thermometer. At Mexico in consequence of its much superior elevation we find a very material reduction in the temperature of the boiling point & when the pressure of the atmosphere is nearly entirely removed as to be in vacuo we find the boiling point still more materially reduced. But there is yet another & stronger illustration of the fact in point. When the experiments were first made at the suggestion of Count Rumford for producing ebullition in a separate boiler by the introduction of steam into the liquid in it from a detached boiler or generator every attempt to produce the required effect failed while the steam was carried as near as possible to the bottom of the liquid. Why was this? Because the steam so [illegible] disposed of compressed or compacted the particles or molecules of the liquid together & it could in consequence find no admission or entrance for the caloric or heat it contained. But the steam thrown down to the bottom could throw out its force
in a different manner for the liquid found room for expansion above and this
expansion permitted the easier introduction of the Caloric and consequently the dis
=integration of the particles or molecules from each other. Now what is this dis
=integration? Does it not at one glance unfold the whole theory of absorption?
and Evaporation? The fact is most clearly elucidated and illustrated by the simple
act of holding before a fire a wet towel or napkin. The heat from the fire has
scarcely reached it before we perceive the vapour or steam flying off from it.
Is it not as much vapour or steam
as if it arose from boiling water? And if so how came it that a temperature
so very much below the boiling point so instantaneously produced a similar ef
=fect? Was it or was it not the disintegration of the particles or molecules of the
water from each other caused by the absorption of the minute vegetable fibres of
which the towel or napkin was composed? If this inference be doubted again
immerse the same towel or napkin and wring out the water it had imbibed
these particles or molecules are reunited or re-integrated and the temperature
of the boiling point has to be attained before the water will throw off its vapour
or steam. The same fact is exemplified by water placed in an unglazed clay
vessel. The minute pores of the clay disintegrate the particles or molecules of the
water & they arrive at the outside fly off more or less rapidly according to the
prevalent temperature or must like the vapour from the towel or napkin
to make room for successors. The earth itself performs the same operation on an
enlarged scale. These facts have here been noticed and so fully dilated upon the
better to elucidate the vast importance of this disintegration in aiding the
rapid the generation of steam. We will now proceed to state certain means
for producing this dis integration within steam boilers.
It is known that the Caloric or heat essential to
produce ebullition in the ordinary way is first transmitted to the rest of the fluid
by that part of it next in contact with the fire or heat and that it but gradually
makes its way towards the centre. To get over this difficulty it is proposed to trans
mit as much as possible of this Caloric through the medium of small horizontal
vertical or diagonal pipes at once to the centre; which will have the effect of
preventing the compacting or compressing against the same central and cool -ow of the fluid in Consequence of the greater Expansion of the part of it nearest the Contact with the Caloric. But the better to accomplish the desired object whenever the Space in the boiler will permit it, Hollow Cones are to be placed with their wide bases resting as near as possible to admit the Circulation of the water below on that part of the boiler under which the flame passes with their apexes or apices 2. 3. 4 or more inches above the level of the water in the Boiler.

The effect thereby produced will be to raise the heated water from below and to eject it from the apex of the Cone in the same manner as lava from a Crater of a Volcano or Cold water from a [illegible] foun-tain These pipes or Cones are not designed to be fixtures in the boilers but are merely placed in them and can at pleasure be taken out & put in & removed in whole or in part. — And not at all unlikely the proposed or desired dis integration may be efficiently aided by placing a little below the apices of each cone a Sort of Cullender with very Small orifices through which the ejected hot water may be made to percolate through these very small apertures which by the diminished bulk will have the effect greatly to accelerate the conversion of these particles into Steam or Vapour Notwithstanding the prevailing idea that the temperature of of Steam can be no higher than that of the water from which it has been Generated, for the latter still retains the latent heat which the former gave up on becoming Vapour The next object is to overcome the Compaction of the particles or Molecules of the water in the boiler by the pressure of the already generated Steam upon it. The remedy for this has in some measure been already anticipated by what has been said of the difficulty experienced in carrying Count Rumford's suggestion of producing Ebullition by Steam from another boiler into effect.

If the Steam generated in an adjacent boiler could be made to answer the desired purpose by throwing the Steam to the bottom of the fluid in the other boiler, so why should not the Steam already generated in this same last boiler if thrown in the same manner below the water by means of pipes connected with the Steam reservoir or Chamber produce an exactly sim-ilar effect. For by this operation the Steam thus thrown to the bottom and pla-ced so nearly in contact with the Caloric would by its increasing expansibility the more readily insinuate itself into and through the superincumbent water and thereby accelerate the generation of fresh Steam. But although it may not be deemed essential for obtaining the desired dis-integration I still [illegible] conceive [illegible] that atmospheric air either cold or hot (perhaps the former in preference on account of its greater density and capacity for expansion) might be forced to the middle or bottom of the water from which the steam is generating and its expansibility might materially assist in the proposed dis-integration and at the same time impart an increased force to the steam [illegible] whilst its easier condensation would materially relieve the labour of the air pump of a low pressure or condensing engine. The principles above set forth it will be manifest may be applied to boilers of almost every description whether vertically horizontally or otherwise placed; or whether they be of high or of low pressure and the consequent rapid generation of the steam ought in course to cause a material reduction in the consumption of fuel.

What I claim as my own invention and not previously known in the above described steam boiler for generating steam of high or low pressure; is the principle of transmitting the caloric through the medium of small horizontal vertical or diagonal pipes or tubes at once to the center or other part of the fluid which will have the effect of preventing the compacting or compressing against the more central and cooler parts of the said fluid in consequence of the greater expansion of that part of it nearest the contact with the caloric.

Also raising the water from below and discharging the same through the apex of the cone or through the pipes or tubes above or below the level of the water in the boiler as above specified and described. There may be many methods for producing the same effect but I claim the principle as set forth in my specification, however performed Washington City D. of Columbia [illegible] March 18[illegible]

Witnesses
[illegible]
George [illegible]

Wm Scarborough

[1800 [illegible]

Exd. [illegible]